Nov. 1, 1966   L. SOLET ET AL   3,282,391
ARTICLE HANDLING TRANSFER APPARATUS
Filed March 8, 1965   11 Sheets-Sheet 4

INVENTORS
LOUIS SOLET
DEWEY MAINE EVANS
BY
Curtis, Morris & Safford
ATTORNEYS

Nov. 1, 1966   L. SOLET ET AL   3,282,391
ARTICLE HANDLING TRANSFER APPARATUS
Filed March 8, 1965   11 Sheets-Sheet 5

INVENTORS
LOUIS SOLET
DEWEY MAINE EVANS
BY
Curtis, Morris & Safford
ATTORNEYS

FIG. 15

INVENTORS
LOUIS SOLET
DEWEY MAINE EVANS
BY
Curtis, Morris & Safford
ATTORNEYS

United States Patent Office 3,282,391
Patented Nov. 1, 1966

3,282,391
ARTICLE HANDLING TRANSFER APPARATUS
Louis Solet, Gibraltar, and Dewey Maine Evans, Livonia, Mich., assignors to Ajem Laboratories, Livonia, Mich.
Filed Mar. 8, 1965, Ser. No. 437,865
6 Claims. (Cl. 198—19)

This invention relates to equipment for the automatic handling of articles of manufacture. The apparatus of the invention is particularly advantageous for supplying articles to a number of similar machining units arranged in series along the supply path from which the articles to be machined or otherwise treated are being fed.

Automatic handling of articles of manufacture has become important for a number of reasons in addition to the frequently cited saving of labor costs resulting therefrom. For example, automatic handling of articles avoids random errors of judgment made by personnel such as improperly positioning articles on machinery for processing, skipping essential processing steps, and reporting damage to articles inadvertently dropped or bumped during handling. In addition, if a processing operation were dependent on time for its efficacy, too long or too short processing often resulted in defective articles of manufacture.

Of course, automatic handling of articles does not totally avoid all of these problems, but the random occurrence of articles improperly processed is markedly reduced by automatically handling the articles; therefore, the total number of defective parts that continue "in line" for further processing or that reach the consumer is greatly reduced.

Among the problems met in achieving feasible automatic handling is the economizing on space and equipment. For example, if one automatic apparatus can process three or four times the number of articles that another apparatus can process, a problem is encountered in efficiently distributing articles from the faster operation to the slower operations. This has been done in the past by dividing the flow of articles evenly so that, for example, the stream of articles coming from the faster process would be broken into three or four paths each supplying a slower operation. This type of arrangement is not altogether acceptable for many purposes. For example, the ratio of time required to complete the faster and slower operations may change from time to time and even approach a 1 to 1 ratio. However, even if this occurs most frequently the higher ratio still dictates the number of flow lines which must be kept in readiness for the next manufacturing order. Furthermore, the cost and space consumption of the multiple article flow lines makes their elimination desirable.

It is an object of the invention to provide apparatus for automatic processing of articles.

It is another object of this invention to provide automatic parts handling apparatus whereby a single supply line can be successfully integrated with a number of processing machines.

It is another object of the invention to provide means for programming such apparatus so that each part is not subjected to redundant processing operations.

It is a further object of this invention to provide such apparatus advantageous for use in combination with a walking beam conveyor.

Applicants have substantially achieved the aforementioned objects by the present invention.

In this application and accompanying drawings, we show and describe a preferred embodiment of our invention and suggest various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it in a variety of forms, each as may be best suited to the condition of a particular case.

The apparatus shown in the drawings comprises three major types: manipulators, a walking beam conveyor, and a memory or programming device operable to enforce co-operation between the conveyor and manipulators.

In the specific apparatus, the operation of which is to be described, there are three manipulators arranged alongside of a walking beam conveyor, i.e., at the third and seventh and eleventh article-resting positions of the conveyor. On the opposite side of each manipulator from the walking beam, is a processing machine which is being fed articles by the manipulator which articles the manipulator has picked off of the walking beam and which articles the manipulator will return to the walking beam.

In the embodiment of the invention specifically described there are two articles being handled by the manipulator at the same time. This is made possible by providing the manipulator with two sets of clamps. In general one set of clamps will be seen to handle articles being carried from the conveyor to the processing machine and the other set of clamps will carry the processed article from the processing machine to the conveyor. This is a particularly advantageous feature of the apparatus because it means that, when the processing makes a major change in the dimensions of an article being processed, the pertinent clamps can be designed for the processed articles independently of the clamps designed for the rough or unprocessed articles.

The walking beam conveyor and the manipulator are operably related by a programming mechanism. In general, the programming mechanism provides a record of a finished part as it proceeds through each position on the conveyor. This record provides means to de-activate downline manipulators when an article already processed by an upline manipulator passes the downline manipulators.

Describing first the manipulator 20 shown in FIGURES 1 through 7, 17 and 18, it is seen that manipulator 20 comprises a frame 22 having two guide shafts 24 and upon which is mounted vertically moveable pick-up support frame 26. Frame 26 is vertically positioned by lift cylinder 28 acting on lift rod 30. Limit switch 32 and limit switch 34 are positioned to provide means for sensing the limits of vertical motion of pick-up support frame 26 by engagement with limit switch actuators 33 and 35 to indicate upward and downward movement respectively. Pivotally mounted on horizontal member 36 of frame 26 is swing cylinder 38 adapted to control the angular position of arm-support 50 which the cylinder 38 is pivotally attached through clevis 42.

Figure 1:
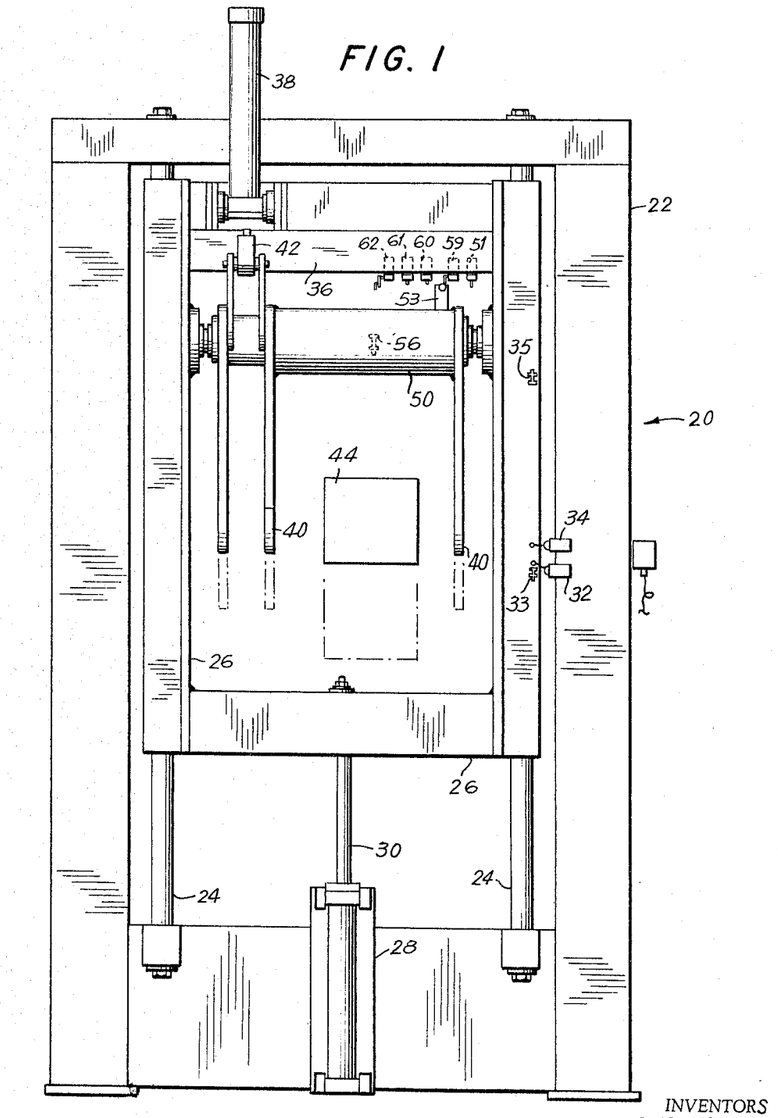
FIGURE 1 is a schematic elevational view of an article manipulator apparatus. The view is taken normal to the flow direction of a walking beam conveyor device not shown, but which would be placed between the viewer and the apparatus of FIGURE 1.
Figure 2:
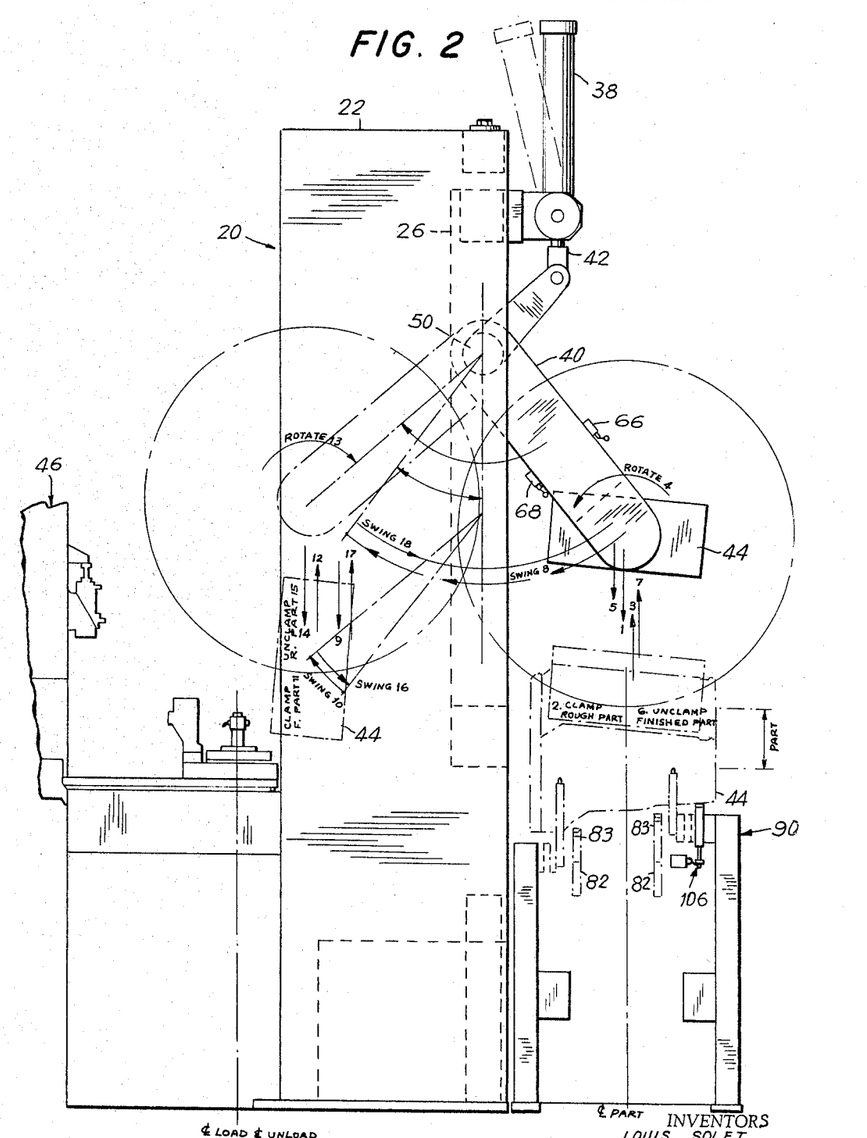
FIGURE 2 is a schematic elevation, partly in section, showing a manipulator of FIGURE 1 and also the relationship of the apparatus to a walking beam conveyor from which the manipulator takes articles to be processed and to which it returns finished articles. Also shown is the relationship between the manipulator and an article processing machine.

FIGURE 2 shows various positions of an article 44 held in pick-up arms 40 of manipulator 20 as it is carried through a cycle on the manipulator. The higher and lower positions of the arms are each shown, the latter in broken lines. Similarly the angular position of swing cylinder 38 is also shown in broken lines. Processing machine 46 is shown at the left and a section of a walking beam conveyor 90 is shown at the right. The numbered arrows will be referred to hereinafter, they generally describe the movement of an article through a cycle as its position is determined by (1) the vertical position of frame 26
(2) the swing position of arms 40 and
(3) the swing position of article clamp assembly not shown on FIGURE 2 but which is shown in FIGURES 17 and 18, will be described below, and is rotatably attached to arms 40.

Figure 3:
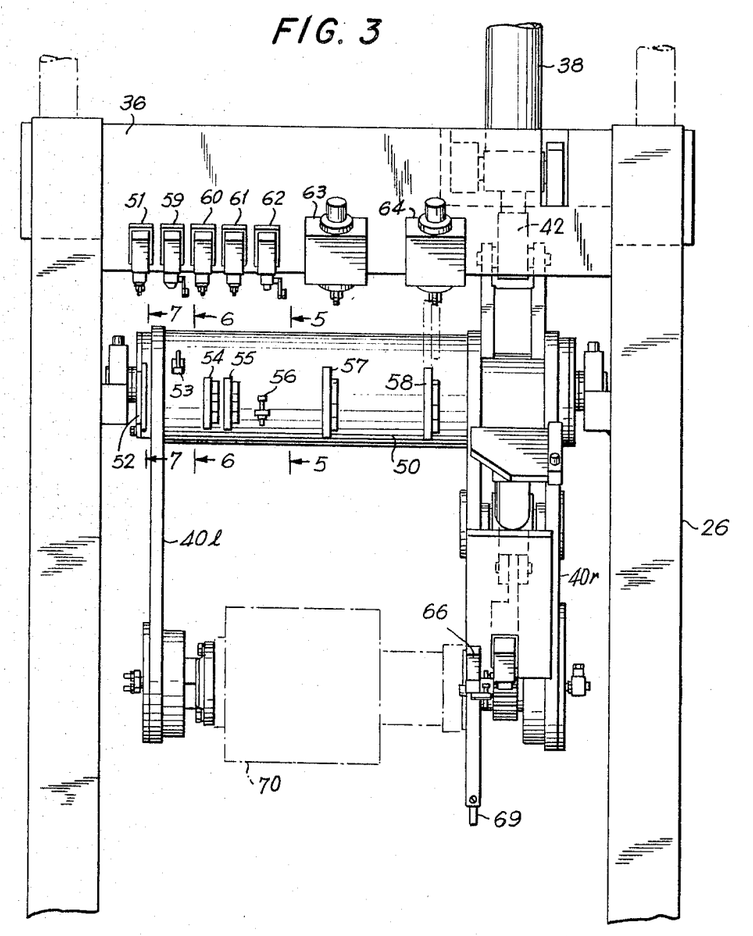
FIGURE 3 is a partial elevation of a manipulator but showing more detail than FIGURE 1, and taken from the opposite side of the apparatus.
Figures 4, 5, 6, 7:
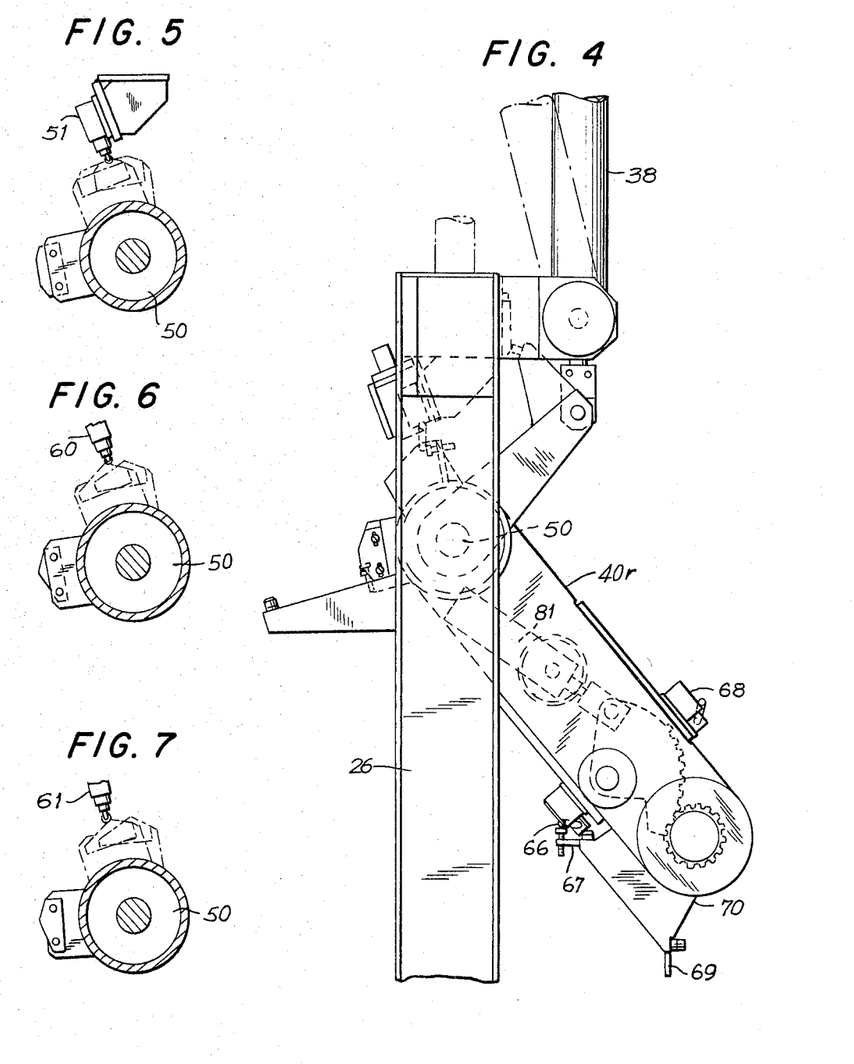
FIGURE 4 is a partial side elevation, of a manipulator but showing more detail than FIGURE 2.
FIGURES 5 through 7 show various views of cams mounted on a manipulator for switch-operating purposes.
Figure 17:
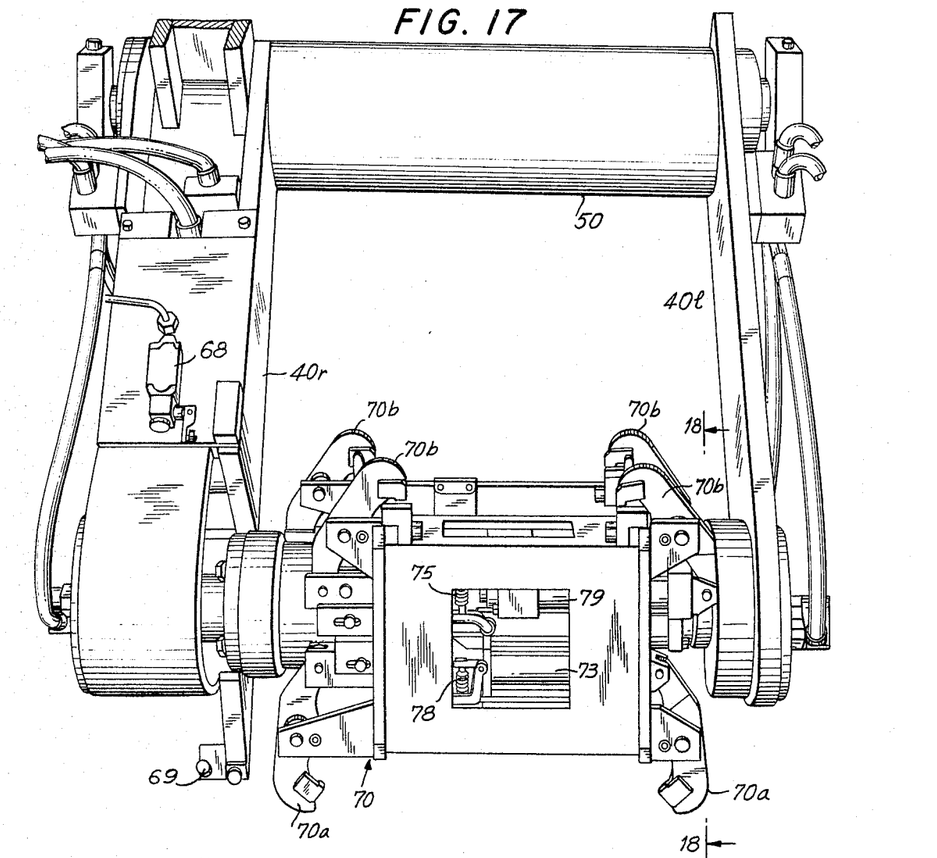
FIGURE 17 is a front view in perspective of a clamping assembly showing the position of hydraulic cylinders and air switches therein.
Figure 18:
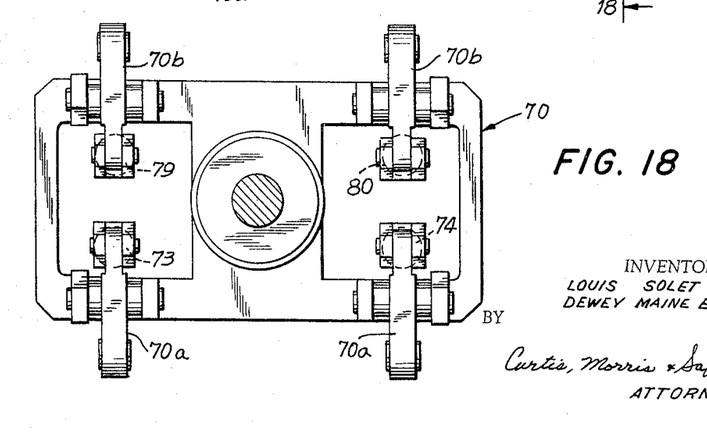
FIGURE 18 is an end view of the clamp assembly taken on section 18—18 of FIGURE 17.

Pick-up arms 40 include arm 40l and arm 40r as more clearly seen in FIGURES 3, 4 and 17. Arm 40r contains the drive mechanism for rotating clamp assembly 70.

Arm-support 50 is rotatably mounted on support frame 26. On this arm-support are mounted switch actuators 52, 53, 54, 55, 56, and deceleration valve cams 57 and 58. For the sake of clarity, these actuators are not shown in their precise position, but on reading this specification those skilled in the mechanical arts will be able to place them to achieve the degree of movement desirable for the operations which they wish to perform and which are described below.

These switch actuators are set at particular angles (see, for example, FIGURES 5 through 7) for programmed cooperation with limit switches 51, 59, 60, 61, 62, and deceleration valves 63 and 64 mounted on member 36 when arm-support rotates to certain angular positions.

Limit switches 66 and 68 are mounted one on each side of arm 40r and are positioned to be tripped at the limits of rotation for article clamp assembly 70 rotatably mounted between arms 40. Tripping is done by actuators 67 and 69 respectively which rotate with clamp assembly 70.

From the foregoing, it can be readily seen means have been provided for controlling the vertical and angular movement of arms 40 and clamp assembly 70 mounted thereon. A particular mode of operation of these will be described below.

Clamp assembly 70, shown only schematically in FIGURE 3 is seen in greater detail in FIGURES 17 and 18.

Figure 16:
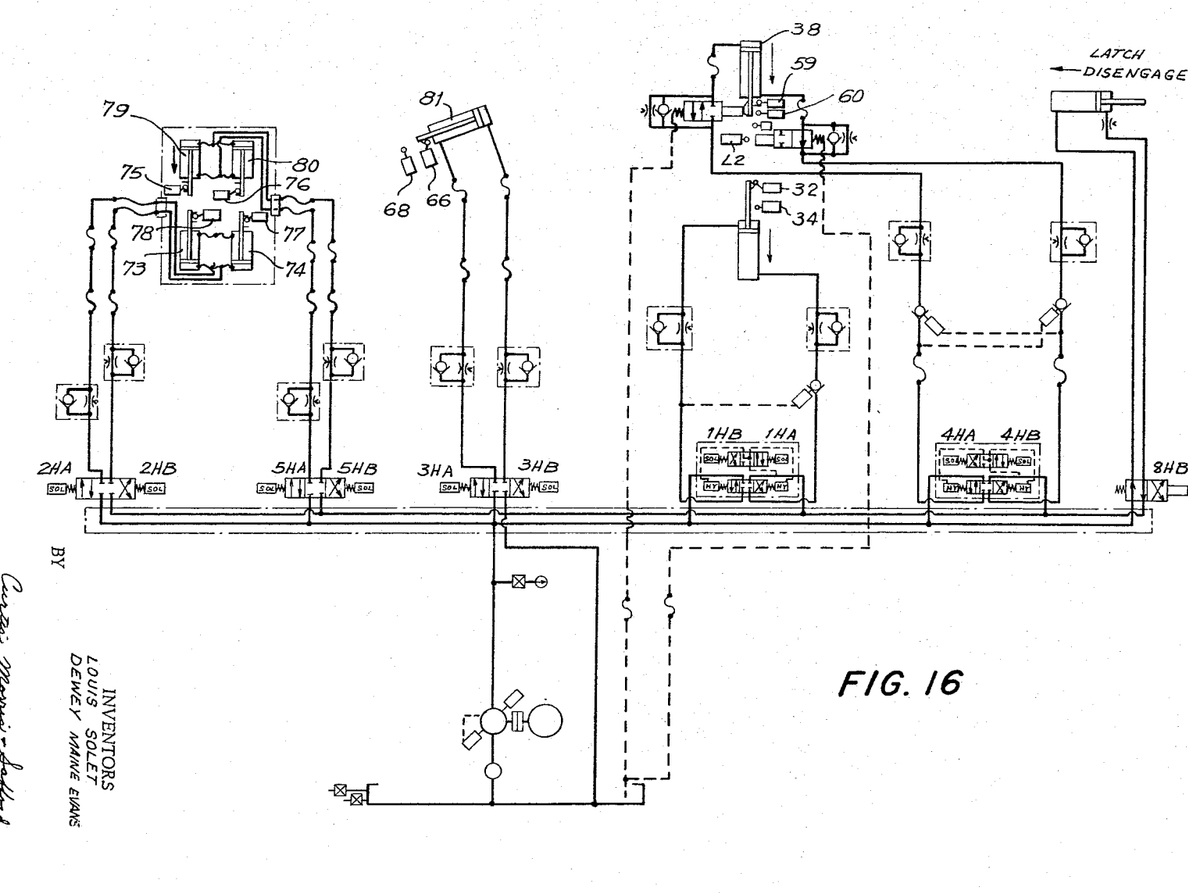

It is rotatably mounted on arms 40 and has two sets of clamps 70a and 70b, each operated by hydraulic cylinders as seen in FIGURE 16. Clamps 70a are operated by hydraulic cylinders 73 and 74. Clamps 70b are operated by hydraulic cylinders 79 and 80. The clamp assembly is rotated by hydraulic cylinder 81, the position of which is shown in FIGURE 4.

An air valve is operated by the movement of each aforesaid hydraulic clamping cylinder and each such air valve determines the position of a pressure switch as will be described below. With reference to FIGURE 16, the position of the following cylinders controls the position of the oppositely listed air valves. Air valves 76 and 77 are not shown in FIGURE 17, but their position is analgous to the positions of valves 78 and 75.

| Cylinder | Air Valve | Pneumatic Switch |
|---|---|---|
| 73 | 78 | PS-5 |
| 74 | 77 | PS-6 |
| 79 | 75 | PS-3 |
| 80 | 76 | PS-4 |

The pressure switches may be placed at any convenient location near the apparatus, are known to persons skilled in the art, and are consequently not shown on any drawing. They will be referred to below in describing the operation of the apparatus.

The walking beam conveyor 90 is of the type known to the art. See commonly-owned applications Serial Nos. 179,412, 218,358 and 263,383 filed March 13, 1962, now Patent No. 3,215,260, August 21, 1962, now Patent No. 3,139,171, and March 4, 1963, respectively by Umbricht et al. In this type of conveying apparatus an article is carried step-wise from position to position down a track by a reciprocating transfer bar having a repetitive and roughly rectangular clockwise motion. In the upper part of its rectangular motion, the transfer bar is in conveying position, i.e., it pushes or lifts an article forward one position on the conveyor. In the lower part of the rectangular motion, i.e., the return motion of the pusher, the transfer bar is out of article-engaging position and it has no effect on the position of any article. On the conveyor used in the present embodiment there are eighteen positions; thus an article is pushed in sequence through the 14 separate rest positions to the end of the conveyor.

Figures 12, 13, 14:
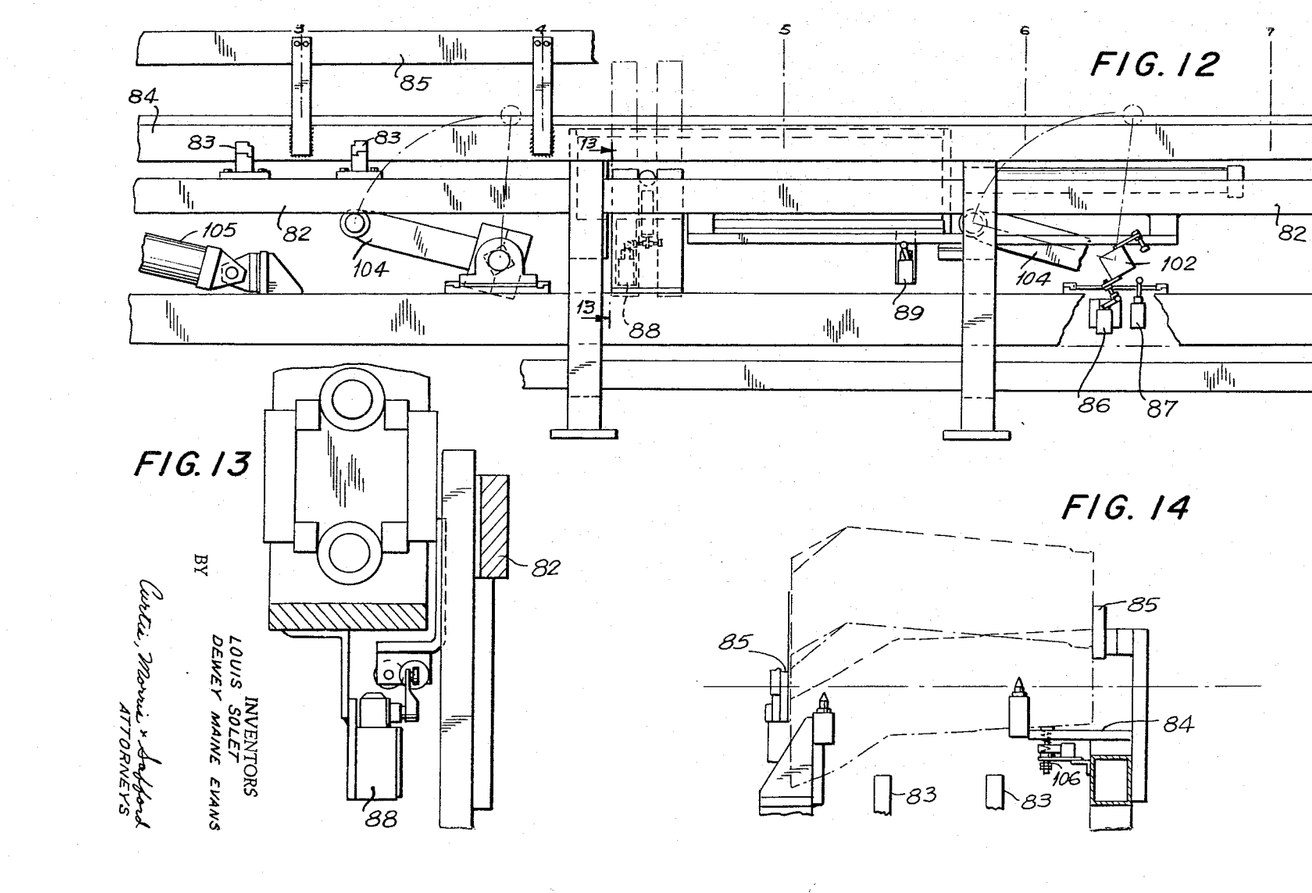
FIGURE 12 shows part of a walking beam conveyor device.
FIGURE 13 shows section 13—13 of a switch mounted on the walking beam of FIGURE 12.
FIGURE 14 shows a cross sectional end elevation of the walking beam conveying section.

The pertinent parts of the walking beam conveyor can be described adequately for understanding its basic mode of operation with reference to FIGURES 12 and 14 which show segments of such a conveyor.

Bar 82 is the transfer bar and has, spaced, along its length, article rest guides 83. These rest guides 83 can engage and carry an article forward when in raised position, i.e., in a position so that they protrude above article-rest rail 84. Rest guides 83 are shown in their lowered and rearmost position in FIGURES 12 and 14. Guide rails 85 are mounted above article-rest rails 84. Limit switches 86, 87, 88, and 89 are all mounted on walking beam 90.

Figure 8:
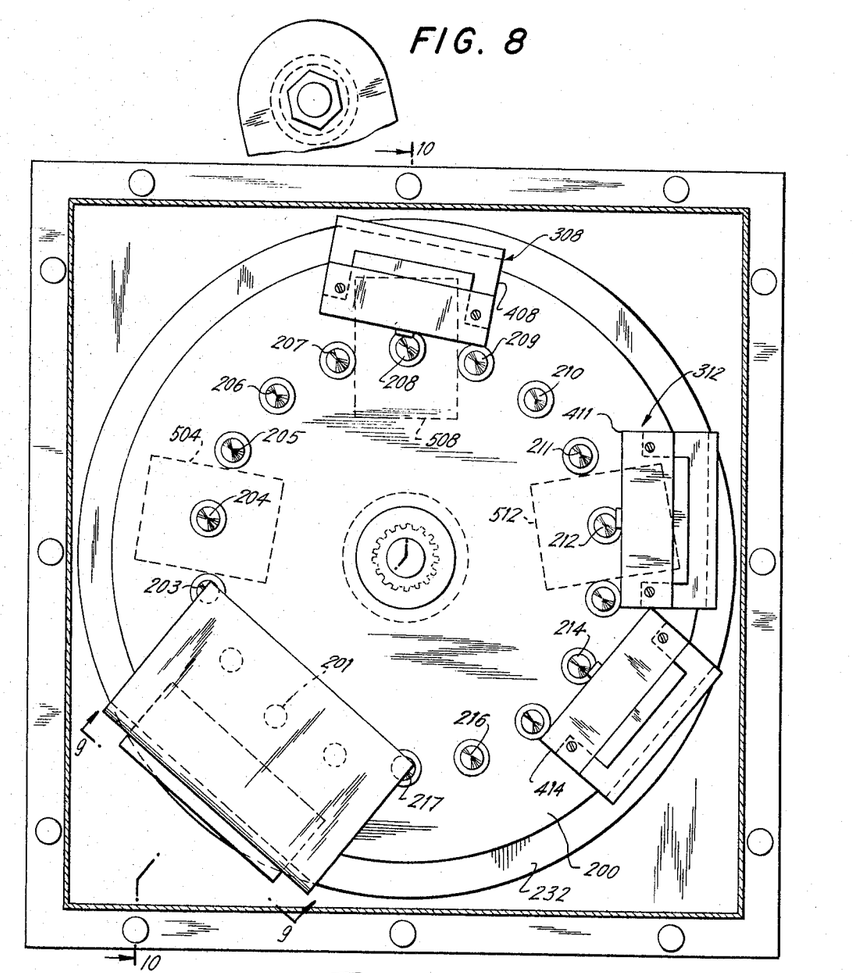
FIGURE 8 shows a side elevation of an electro-mechanical memory device.

FIGURE 8 shows a memory disk 200 having eighteen spaced pins 201 to 214 each representing an article progressing step to step on walking beam conveyor 90. The degree by which the pins protrude from disk 200 as will be seen below, is dependent on whether or not the represented article has already been processed or not. If there is an absent article, i.e., an unfilled station on the walking beam, the pin will be in the same position as if an unprocessed article were in the station.

Mounted adjacent disk 200 are assemblies which represent each of the manipulators adjacent the walking beam.

Signal assemblies, numbered 308, and 312 respectively, comprise: limit switches 408 and 411; solenoid pin actuators 508 and 512.

Figure 10:
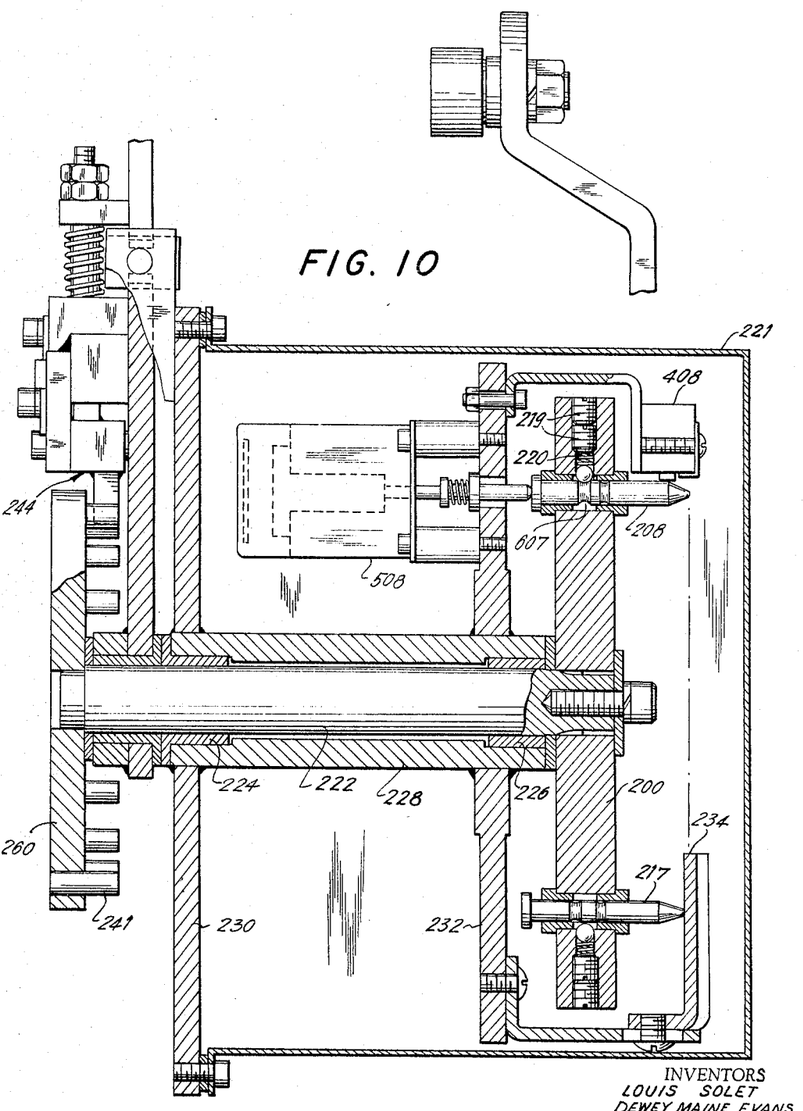
FIGURE 10 shows a section of the memory device taken on line 10—10 of FIGURE 8.

Referring to FIGURE 10 each pin 201 to 218 is in biased relationship with a double detent 607 as seen in FIGURE 10. Set screws 219 and spring 220 maintain this relationship.

Memory disk 200 is encased in a transparent plastic cover 221 and rotates on shaft 222 which is held in bearings 224 and 226 set in sleeve 228. Mounting plate 230 forms the bottom of the assembly casing and disk 232 provides means for mounting signal assemblies 308 and 312.

Figure 9:
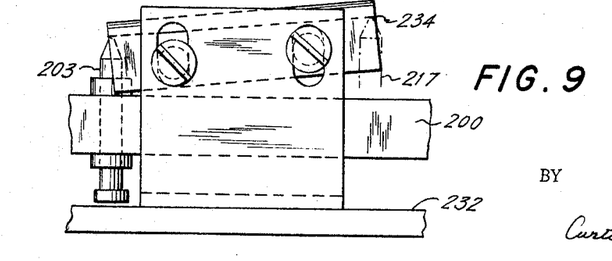
FIGURE 9 taken on line 9—9 of FIGURE 8 shows a pin-return method utilized on the memory device of FIGURE 8.

Memory disk 200 is rotated by mechanical engagement to the drive system of walking beam conveyor 90. For each indexing, i.e., synchronized rectangular cycles of the walking beam conveyor, the memory disk, and consequently each article-representing pin thereon, is advanced counter clockwise 20°, i.e., one-eighteenth of a complete revolution. It is noted that after the pin passes limit switch 414, representing the last processing machine, there is a diagonal cam bar 234 mounted at disk 232 which forces the pin into its lowered position, thus preparing it for representation of an unfinished article as it reaches the first represented walking beam conveyor position. Cam bar 234 and its mounting are shown in FIGURE 9.

Referring to FIGURE 8, it should be noted that actuator 504 represents the first processing machine which is station 3 of the walking beam. It is noted that a signal assembly representing this first processing machine need not contain a limit switch. Obviously, this is because no part approaching the first processing machine has yet been processed.

It should also be noted that actuator 508 represents the second processing machine which is at station #7 of the walking beam, and that actuator 512 represents the 3rd processing machine which is at station #11 of the walking beam.

The limit switch at pin 214 represents station 13 of the walking beam and its function is to prevent any unprocessed article from passing.

Figures 11, 11A:
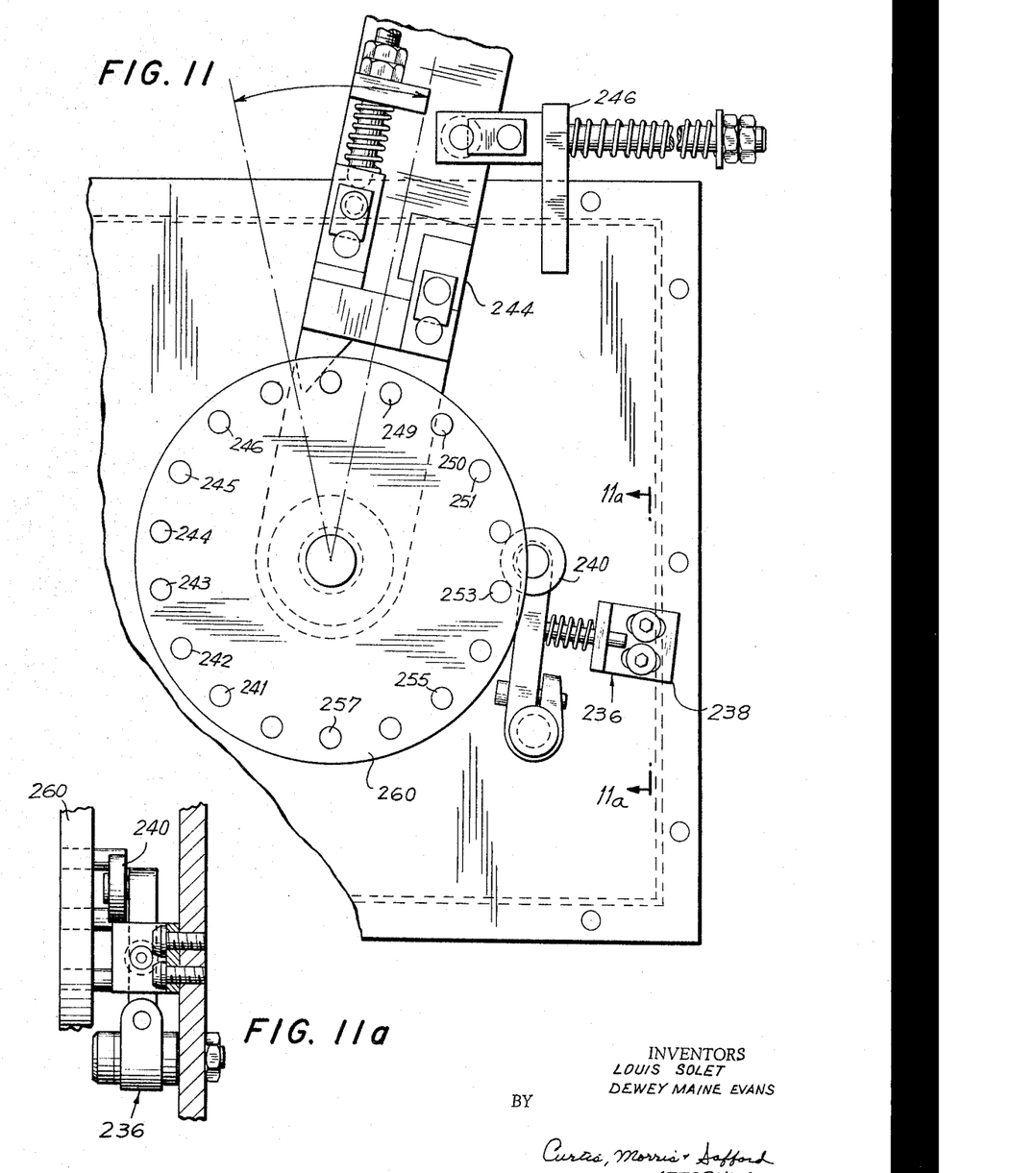
FIGURE 11 shows a bottom view of the memory device.
FIGURE 11a is taken on section 11a of FIGURE 11 and shows a brake mechanism.

Referring to FIGURES 11 and 11a a brake assembly 236 is held in biased relationship between bracket 238 and roller brake 240, each of which is mounted on mounting plate 230. Studs 241 to 258 inclusive are mounted on disk 260 in positions corresponding to pins 201 to 218 on disk 200. Roller 240 merely acts to engage studs 241 to 258 as they are rotated and thereby prevent inertial movement of the pins beyond the intended 20° advancement.

Ratchet 244, with spring return unit 246, pivotally arranged thereon, are used to drive the memory system or programming system and said ratchet is synchronized for operation with each indexing of walking beam conveyor 90.

Figure 15:
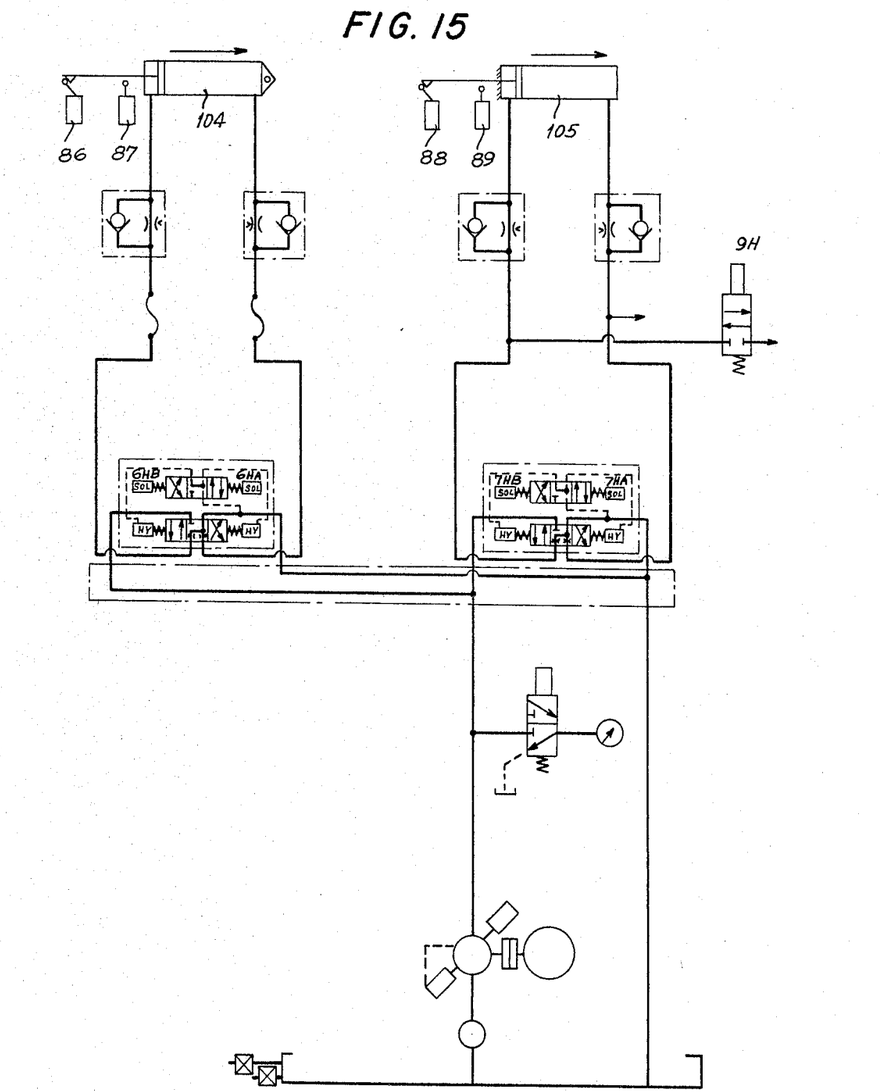
FIGURES 15 and 16 show control circuits for the apparatus.

The co-operative and synchronized operation of the described apparatus is set forth below with reference to the hydraulic and pneumatic and electrical control circuits shown in FIGURES 15 and 16.

In general, hydraulic cylinders are used to raise and lower frame 26, to rotate arm support 50 and clamp assembly 70 and move 70a and 70b into and out of clamping position.

The hydraulic circuits are generally controlled by operation of either pneumatic switches or by solenoid-operated valves. In this respect, the circuitry is similar to that well known in the art.

It is to be explained that the circuit described is one wherein two sets of clamps, 70a and 70b, are mounted on clamp assembly 70, each set at 180° angle from the other. Thus the apparatus can handle two articles at a single time.

Clamp assembly 70 is caused to rotate by pressure exerted by hydraulic cylinder 81 as seen in FIGURES 4 and 16.

The clamping action is obtained by actuation of four hydraulic cylinders mounted within the clamp housing.

A number of air switches are also enclosed in the clamp fixture. These are mechanically operated by the aforesaid clamping action and in turn actuate pressure switches mounted outside the clamp assembly housing.

Before automatic operation of the apparatus commences the following conditions are met:

Frame 26 is raised and limit switch 32 is tripped as has been described by actuator 33.

Hydraulic cylinders 73 and 74 are retracted so that clamps 70 are retracted into non-clamping position.

The clamp fixture is in position to hold an article 44 in a substantially horizontal position as shown in solid lines on the right of FIGURE 2.

Arms 40 are in the "returned" position as shown in solid lines on the right side of FIGURE 2. In this position, limit switch 59 will be tripped.

There will be a part contacting limit switch 106 in the station opposite manipulator 20.

A safety catch, provided for holding frame 46 in upper position in case of failure of hydraulic pressure, is disengaged. This is done by having solenoid 8HB energized.

The walking beam 90 conveyor unit is in a lowered position, i.e., the non-conveying part of the aforementioned rectangular cycle and limit switch 106 is tripped.

All hydraulic pump units are running and the apparatus has been manually set for automatic operation.

In the following numbered steps, the operation of the equipment is described in relation to the movement of articles being processed from the time it is clamped onto (step 2) by clamps 70a until it is returned (step 18) just prior to being set down in processed condition on walking beam 90.

It should be remembered that the clamp fixture contains two sets of clamps, 70a and 70b, and that other articles referred to in step 6 and step 11, as finished parts are being processed simultaneously with the part which we follow throughout steps 1 to 19.

Also helpful in understanding steps 1 through 19 is the fact that the various pressure switches are designated as PS3, PS4, PS5 and PS6.

The "A" and "B" following these designations refer to the position of the switch, i.e. it is in position A or position B.

Solenoid valve-operated flow-control points at 1H, 2H, 3H etc. The letter designations "A" and "B" refer to 2 positions of the same solenoid valved flow station, not two, necessarily, positions of the same solenoid. It is believed that this will be self-evident to those skilled in the art from an inspection of FIGURES 15 and 16, the pneumatic and hydraulic circuits.

With the above conditions met, the automatic action of the manipulator can proceed as follows:

(1) Solenoid 1HA is activated causing frame 26 to be hydraulically lowered. Frame 26, on being lowered trips limit switch 34. The tripping of limit switch 34 deactivates solenoid 2HA and activates solneoid 2HB in the hydraulic control circuit shown in FIGURE 16.

(2) Pneumatic cylinders 73 and 74 are thereby activated to engage on unprocessed article 44 on walking beam 90. This movement of cylinders 73 and 74 mechanically causes the tripping of air valves 78 and 77 within the clamp assembly and the consequent tripping of PS5B and PS6B mounted on structure 20.

(3) The tripping of PS5B and PS6B deactivates solenoid 1HA and activates solenoid 1HB causing frame 26 to be hydraulically lifted. This lifting of frame 26 causes the tripping of limit switch 32 with actuator 33.

(4) The tripping of limit switch 32 deactivates solenoid 3HA and activates solenoid 3HB causing the hydraulic actuation of clamp rotate cylinder 81 and the consequent clockwise rotation (with reference to FIGURE 2) of clamp assembly 70, the clamped article therein and also the tripping of limit switch 68 by actuator 69. Clamps 70a are now in the top position; clamps 70b are in the lower position.

(5) The tripping of limit switch 68 deactivates solenoid 1HB and activates solenoid 1HA thus causing frame 26 to be hydraulically lowered. The lowering of frame 26 again trips limit switch 34, also positions a finished part on walking beam 90.

(6) The deactivation of limit switch 34 causes the simultaneous deactivation of solenoid 5HB and the activation of solenoid 5HA and resultant hydraulic pressure in cylinders 79 and 80 opens clamps 70b and leaves a finished part in position on the walking beam 90. The unclasping action causes the tripping of air-valves 75 and 76 and the resultant tripping of PS3B and PS4B.

(7) The tripping of PS3B and PS4B deactivates solenoid 1HA and activates solenoid 1HB, again raising frame 26, and the tripping of limit switch 32.

(8) Limit switch 32 deactivates solenoid 4HB and activates 4HA causing arm 40 to swing to the midposition, said swing causing the tripping of limit switch 60 and limit switch 61. The tripped position of limit switch 32 is interlocked with the walking beam transfer mechanism so that the mechanism may only proceed into its raised, i.e., advance position when limit switch 32 is tripped. Thus the walking beam is now free to go to its raised position.

(9) The tripping of limit switch 60 deactivates solenoid 4HA and solenoid 1HB and activates solenoid 1HA lowering frame 26 and subsequently tripping limit switch 34.

(10) Limit switch 34 being tripped, 4HA is energized and arms 40 are swung through to full forward position, i.e., towards the left as seen in FIGURE 2. This causes limit switch 62 to be tripped.

(11) The tripping of limit switch 62 deactivates solenoid 5HA and activates solenoid 5HB activating cylinders 79 and 80 to close clamps 70b on a finished part. This movement of clamps 70b causes, by mechanical actuation of air valves 75 and 76, the tripping of PS3A and PS4A. The tripping of PS3A and PS4A opens a holding clamp on the processing machine, 46, allowing the finished part to be removed therefrom.

(12) The tripping of PS3A and PS4A causes the deactivation of solenoid 1HA and the activation of solenoid 1HB raising frame 26 and consequently tripping limit switch 32.

(13) The tripping of limit switch 32 deactivates solenoid 3HB and activates solenoid 3HA causing, through hydraulic cylinder 81, rotation of clamp assembly 70 until it trips limit switch 66. Clamps 70a are now returned to the lower position.

(14) The tripping of limit switch 66 deactivates solenoid 1HB and activates solenoid 1HA causing frame 26 to be hydraulically lowered and to trip limit switch 34. The tripping of limit switch 34 activates a signal causing the process machine 46 to clamp onto the rough part just deposited thereon.

(15) The tripping of limit switch 34 causes solenoid 2HB to be deactivated and causes solenoid 2HA to be activated thereby hydraulically actuating cylinders 73 and 74 and unclamping the unprocessed part from clamps 70a onto the process machine 46. This unclamping action trips PS5A and PS6A through air valves 78 and 77 which are tripped when cylinders 73 and 74 are moved.

(16) PS5A and PS6A cause the deactivation of solenoid 4HA and the activation of solenoid 4HB and thereby return arms 40 to the vertical or mid-position. This return swing causes the tripping of limit switches 60 and 61. Limit switch 60 sends a signal to the processing machine allowing it to be activated.

(17) The tripping of limit switch 60 also causes the deactivation of solenoid 4HB and solenoid 1HA and the activation of solenoid 1HB. Frame 26 is thereby once more raised to trip limit switch 32.

(18) Limit switch 32 activates solenoid 4HB returning the swing of arm 40 to fully returned position causing the tripping of limit switch 59.

It is now possible for manipulator 40 to repeat its cycle if the walking beam 90 has been provided with an unprocessed part in the position opposite the manipulator.

For the walking beam transfer bar 82 to go through a transfer cycle, there must not only be a part in the station opposite the manipulator 40, but limit switches 86 and 88 must also be tripped and the manipulator must be raised over the walking beam advance stroke position. When these conditions are met, solenoid 4HA will have been activated by limit switch 32. Unless solenoid 4HA is activated by limit switch 32, the walking beam cannot go through an advance cycle.

As has been seen, an article was placed on walking beam 90 during steps 5 and 6 above. This article is at rest on a railing until transfer bar 82 is carried through its advance cycle in the raised position. Referring to FIGURES 12, 14 and 15, it is seen that limit switches 86, 87 are tripped by actuator 102, which moves with lift arm 104. In general, limit switch 86 is tripped on the lowering action of the transfer bar 82 in its advanced position; limit switch 88 is tripped on the return of transfer bar 82 in its lowered position; limit switch 87 is tripped when the transfer bar rises in its returned position; and limit switch 89 is tripped during the forward transfer stroke. Switches 88 and 89 are actuated by movement of the lateral motion cylinder on the walking beam shown diagrammatically on FIGURE 15.

For the transfer to cycle in proper synchronization the following conditions should be met:

The transfer is in its lowered and rearmost position, i.e., so that limit switches 86 and 88 are tripped.

With these conditions met, solenoid 6HB is deenergized and solenoid 6HA is energized causing the transfer bar 82 to raise. This raising movement is accomplished by hydraulic pressure on cylinder 105 seen on FIGURE 12 and diagrammatically on FIGURE 15 and trips limit switch 87 and releases limit switch 86.

Limit switch 87 de-energizes solenoid 7HB and energizes 7HA causing the transfer to advance tripping limit switch 89.

Limit switch 89 de-energizes solenoid 6HA and energizes solenoid 6HB causing the transfer to be lowered. The lowering of the transfer causes the tripping of limit switch 86.

Tripping limit switch 86 de-energizes solenoid 7HA and energizes solenoid 7HB returning the transfer and tripping limit switch 88.

When limit switch 86 is tripped, an interlock with the manipulator allows the manipulator to operate over the transfer to operate such steps as lowering and unclamping articles.

After step 6, as above numbered, has been accomplished, solenoid actuators like 508 are energized. Switch 106 is contacted by the processed article and this contact plus the circuit conditions existing at this time of contact allow energization of the actuators like 508.

It is to be noted that the physical placement of the memory drum is unimportant; it can be placed at any convenient location.

We claim:

1. An apparatus for programming a plurality of processing units each being fed articles for processing by a common conveyor section, said apparatus comprising a plate geometrically representative of said conveyor section, actuating means adjacent said plate, signal means adjacent said plate, said plate and said actuating and signal means being mounted in moveable relationship thereby providing relative movement of said plate past said actuating and signal means which movement is analagous to the linear movement of a position of said conveyor section past said processing units, a plurality of contractors on said plate so spaced in relationship to said actuating and signal means as to represent parts moving on said common conveyor section, said actuating means forming means to alter a characteristic of said contactor, and wherein said actuating means is responsive to the completion of the processing of an article by a first said processing machine, each said contactor in its altered condition being operative to actuate said signal means when said relative movement brings said contactor in register therewith, said signalling means communicating with another processing machine further down said conveyor section to prevent its re-processing said processed acticle, as it is conveyed therepast, and wherein said relative movement is achieved by synchronizing the movement of said plate with the movement of said conveyor section.

2. An apparatus as defined in claim 1 wherein said actuator is a solenoid and said contactor is a pin the position of which is altered by the action of said solenoid.

3. An apparatus as defined in claim 2 wherein said plate is a circular disk whereon a plurality of pins are mounted, each pin representing, in its said altered position a processed article and the position of each pin on said plate representing a progressing conveyor position.

4. An apparatus as defined in claim 1 wherein said synchronization of said conveyor movement and movement of said plate is achieved by direct mechanical connection between said plate and said conveyor.

5. Apparatus for processing articles of manufacture which are being fed to a plurality of processing machines from a common conveyor section, said apparatus comprising a conveyor having a plurality of positions through which said articles are passed and on which said articles rest, a plurality of article-transfer machines arranged alongside said conveyor section and each forming means for picking up said article from said conveyor, depositing said article on a processing machine, and then returning said article to said conveyor section, a parts programming device cooperatively associated with said article-transfer machine and said conveyor section said programming device comprising a plate geometrically representative of said conveyor section, actuating means adjacent the perimeter of plate, signal means adjacent the perimeter of said plate, said plate and said actuating and signal means being mounted in moveable relationship thereby providing relative movement of said plate past said actuating and signalling means which movement is analagous to the linear movement of a position of conveyor section past said processing units, a plurality of contactors on said plate so spaced in relationship to said actuating and signal means as to represent parts moving on said common conveyor section, said actuating means forming means to alter a characteristic of said contactor, and wherein actuating means is responsive to the completion of the processing of an article by a first said processing machine, each said contactor in its altered condition being operative to actuate said signal means when said relative movement brings said contactor in register therewith, said signal means communicating with another processing machine further down said conveyor line to prevent its processing of said completed article, as it is conveyed therepast, and wherein said relative movement is achieved by synchronizing the movement of said plate with the movement of said conveyor section.

6. An apparatus as in claim 1 wherein said conveyor section is a section of a walking beam conveyor and said plate representative is synchronized with said conveyor system by linkage to the drive thereof.

References Cited by the Examiner

UNITED STATES PATENTS

| | | |
|---|---|---|
| 2,671,861 | 3/1954 | Bullard. |
| 2,905,936 | 9/1959 | Gossard __________ 340—365 X |

EVON C. BLUNK, *Primary Examiner.*

E. A. SROKA, *Assistant Examiner.*